Dec. 3, 1957    P. J. CAMPBELL    2,814,973
MACHINE FOR SHAPING A WORKPIECE WITH A PREDETERMINED CONTOUR
Filed March 1, 1955    4 Sheets-Sheet 1

INVENTOR
PAUL J. CAMPBELL
BY
*S. Jay Teller*
ATTORNEY

Dec. 3, 1957 P. J. CAMPBELL 2,814,973
MACHINE FOR SHAPING A WORKPIECE WITH A PREDETERMINED CONTOUR
Filed March 1, 1955 4 Sheets-Sheet 2

INVENTOR
PAUL J. CAMPBELL
BY
*S. Jay Teller*
ATTORNEY

Dec. 3, 1957 P. J. CAMPBELL 2,814,973
MACHINE FOR SHAPING A WORKPIECE WITH A PREDETERMINED CONTOUR
Filed March 1, 1955 4 Sheets-Sheet 4

INVENTOR
PAUL J. CAMPBELL
BY S. Jay Teller
ATTORNEY

United States Patent Office 2,814,973
Patented Dec. 3, 1957

2,814,973

MACHINE FOR SHAPING A WORKPIECE WITH A PREDETERMINED CONTOUR

Paul J. Campbell, Moodus, Conn., assignor to The New England Machine and Tool Company, Berlin, Conn., a corporation of Connecticut Application March 1, 1955, Serial No. 491,409

20 Claims. (Cl. 90—13.7)

The invention relates to a machine or apparatus for shaping or cutting a workpiece to provide it with one or more contours corresponding to the contour or contours of a pattern or template. The machine includes a tracer which follows the pattern and which controls the tool for shaping or cutting the workpiece. Within the scope of the invention, the character of the pattern or template may be widely varied and it may consist of one or more lines on a drawing.

Preferably and in accordance with one phase of the invention, the tracer and the pattern are electrically conductive and a means controlled by a spark between the conductive tracer and the conductive pattern is provided for causing said tracer to move so as to follow the shape of said pattern, the tracer and the parts connected therewith serving to effect movements of the tool. The spark controlled means is similar in some respects to that disclosed and claimed in my Patent No. 2,677,310, dated May 4, 1954, for Contour Forming Machine Including Tracer Control Mechanism, reference being had more particularly to the embodiment of the invention illustrated in Figs. 1 to 10 of the patent; and said spark controlled means is similar in other respects to that disclosed in my Patent No. 2,677,311, dated May 4, 1954, for Machine Tool, reference being had more particularly to the features of the invention illustrated in Figs. 6 to 11 and 14 of the patent.

One object of the invention is to provide a machine of the type specified having a simplified tracer forming a part of a spark controlled electroresponsive control system and having a simplified and superior means for connecting said tracer with the guide therefore.

Another object of the invention is to provide a machine of the type specified wherein the tracer guide is a rectilinearly movable slide and wherein the movements of the tool are controlled by an adjustable ratio bar on the slide.

Another object of the invention is to provide a machine of the type specified wherein the electroresponsive control system is adjustable so that the tracer may follow the pattern either at the right or at the left of the immediately adjacent portion of said pattern.

Another object of the invention is to provide a machine of the type specified wherein the electroresponsive control system may be utilized for effecting manually controlled movements of the tracer and tracer guide which movements are independent of the shape of the pattern.

Still another object of the invention is to provide a machine of the type specified having a rectilinearly movable slide and ratio bar and having a spark controlled electroresponsive means associated with the ratio bar for moving the cutting tool.

Still another object of the invention is to provide a safety means for rendering at least the table moving means inoperative in the event of failure of the means for moving the cutting tool.

Still another object of the invention is to provide a machine having a spark controlled means for moving the cutting tool and having provision for utilizing the said spark controlled means for effecting manually controlled movements of the tool which movements are independent of the ratio bar.

Other objects of the invention will be apparent from the drawings and from the following description and claims.

In the drawings I have shown in detail a preferred embodiment of the invention, but it will be understood that various changes may be made from the construction shown, and that the drawings are not to be construed as defining or limiting the scope of the invention, the claims forming a part of this specification being relied upon for that purpose.

GENERAL ORGANIZATION

The presently preferred embodiment of the invention will be first briefly described, and there will then follow detailed descriptions of the parts to which the invention more particularly relates. In the general description the parts will be referred to as specifically shown, although some of said parts are subject to relatively wide variation within the scope of the invention.

The machine as shown in the drawings comprises a main frame or bed which may be a single casting or which may be built from various parts welded or otherwise connected with each other. The bed has portions 10 and 12 at right angles to each other, and for conveniences these portions will be referred to as being respectively "longitudinal" and "transverse." As shown, the transverse portion 12 extends forwardly from the longitudinal portion 10 near the right end of the latter.

Supported on the longitudinal section 10 near the left end thereof is a frame 14 carrying a table 16 which is mounted for rotation about a vertical axis at 17. The table 16 is preferably circular and it has a flat level top face adapted for carrying a pattern having a shape or contour to be reproduced. The upper portion 16ª of the table 16 is preferably formed of insulating material. Supported on the transverse portion 12 near the front end thereof is a frame 18 carrying a preferably circular table 20 which is rotatable about a vertical axis at 19. The table 20 is adapted for carrying a workpiece upon which the shape or contour of the pattern is to be reproduced, a workpiece being shown in place at 21. As shown, the table 20 is provided with T-slots 22, 22 to facilitate holding the workpiece. The rotatable tables 16 and 20 are herein sometimes referred to respectively as "first" and "second" tables.

Rigidly connected respectively with the tables 16 and 20 are two similar worm wheels 23 and 24, said worm wheels being below the tables and within the frames 14 and 18. Similar worms 26 and 28 mesh respectively with the worm wheels 23 and 24, the said worms being secured to a diagonal shaft 30. The shaft 30 is supported in suitable bearings (not shown) in the frames 14 and 18 and at opposite ends of the worms. For convenience, the shaft 30 may have two separate parts connected by a coupling sleeve 31.

For rotating the shaft 30 there is provided an electric motor 32 which is connected with the shaft by means of a belt 34 and suitable gears in a box 36. The details of the means for transmitting power from the motor to the shaft are not a part of the invention and are not fully shown. When the motor 32 is operated, the shaft 30 and the worms are rotated and the tables 16 and 20 are rotated. Due to the similarity of the two worms and of the two worm wheels the tables 16 and 20 are rotated at the same speed and in the same direction. The motor speed and the speed reduction at the gear box 36 and at the worms and worm wheels are such that the tables are rotated relatively slowly. The motor speed may be varied for varying the speed of table rotation.

In order to avoid any lost motion and to insure identity of rotative movements by the two tables, each of the worm wheels 23 and 24 comprises upper and lower parts with one of said parts relatively adjustable rotatively to take up any lost motion. This is illustrated with respect to the worm wheel 23 which has a rotatively adjustable lower part 38. An eccentric element 39 is provided for effecting rotative adjustment, and the part 38 can be clamped in its rotatively adjusted position by a suitable clamping means which is not shown. The teeth on the main body of the worm wheel 23 bear against the teeth of the worm 26 at one side thereof and the teeth on the worm wheel part 38 bear against the teeth of the worm at the opposite side thereof. The relative adjustment of the part 38 is such that there is no lost motion.

A member 40 is provided which is movable toward and from the table 16, this member constituting a tracer guide as hereinafter fully explained. Preferably and as shown, the member 40 is a slide which is longitudinally movable along the bed portion 10, being guided by longitudinally extending ways 42. The means for moving the slide is hereinafter fully described. Carried by the slide 40 at the top thereof is a ratio bar 44 which is angularly adjustable relatively to the slide about a vertical axis at 46 near the right end of the bar. The ratio bar has a straight front working face 48. The face 48 of the ratio bar may be adjusted to any angle within predetermined limits.

A cross slide 50 is transversely movable along the bed portion 12, being guided by a transversely extending guideway 52. The means for moving the cross slide is hereinafter fully described. A head 54 is vertically movable along the front of the cross slide 50, said slide being provided with a vertical guideway 56 for said head. Conventional means including a hand wheel 58 is provided for vertically adjusting the head 54 along the guideway 56. The head is provided with a vertical spindle 60 having a collet or chuck for holding a rotatable cutting tool 62. The head is preferably so constructed that the axis of the tool 62 is movable in a vertical transverse plane extending through the axis of rotation of the table 20. As shown, the tool is behind the axis of the table. For rotating the spindle and the tool there is provided an electric motor 64, the motor being connected with the spindle by suitable change speed gearing within a gear box 66 on the head. The details of the drive for the spindle are not a part of the invention and they are not fully shown. Said cross slide 50 will sometimes be referred to as a "tool support" and said collet or chuck on the spindle 60 will sometimes be referred to as a "tool holder."

In operation of the machine a pattern is secured to the table 16 and a workpiece upon which the contour of the pattern is to be reproduced is secured to the table 20 in position to be engaged by the rotating cutting tool 62. The two tables are slowly rotated in unison as described. Under the control of a tracer that follows the contour of the rotating pattern on the table 16, the slide 40 and the ratio bar 44 are moved longitudinally. Under the control of the ratio bar 44 on the slide 40, the cross slide 50 and the head 54 and the tool 62 are moved transversely in exact proportion to the longitudinal movements of the table 40 and the ratio bar. Thus the rotating workpiece is cut with a shape, usually of reduced size, having a definite relation to the contour of the pattern. The degree of size reduction is dependent upon the angle of the ratio bar.

*Pattern controlled means for longitudinally moving slide and ratio bar*

The slide 40 and the ratio bar are moved longitudinally under the control of a tracer that follows the shape or contour of a pattern on the rotating table 16. A pattern having a contour to be reproduced is secured to the rotatable table 16 for rotation therewith. A pattern of any of a variety of types may be used, and as an example the pattern may be a sheet of metal cut to the required contour. However, the machine is particularly adapted for use with a pattern which is merely a conductive line on a drawing sheet. As shown, a drawing sheet 68 of insulating material is secured by adhesive tape or otherwise to the top face of the insulated upper portion of the table 16, this sheet having drawn thereon an outline or contour 70. The contour 70 is drawn with conductive ink so that current may flow therethrough. The conductive ink may be a mixture of finely divided silver and a binder in a volatile organic liquid. The conductive line 70 is grounded to a conducting portion of the table 16. As shown, grounding is effected by a cross line 72, also drawn with conductive ink, and by a metal bar 74 which overlies the cross line and which is electrically connected by screws 76 to the metal of the table below the insulated upper portion thereof.

The pattern contour 70 must be drawn to have a definite relationship to the shape to be cut on the workpiece and the drawing sheet must be located on the table in a definite relationship to the axis 17. The relationship of the pattern to the axis 17 must be the same as the relationship of the required shape of the workpiece 21 to the axis 19.

A tracer is provided for following the pattern which has been described as being a conductive line 70. As shown, the active part of the tracer is a circular disc 78 which is preferably provided at the bottom thereof with an annular knife edged flange. When the pattern is a sheet metal template, the tracer disc 78 may rest directly upon the top face of the table 16, but when the pattern is a conductive line on a drawing sheet said tracer disc may rest directly upon said sheet. The diameter of the tracer disc 78 must be correctly related to the diameter of the cutting tool 62. As illustrated, the ratio bar 44 is set for a 6 to 1 reduction and the disc 78 therefore ordinarily has a diameter which is six times the diameter of the cutting tool.

The slide 40 constitutes a movable control member for the tracer 78, and when said member is a rectilinearly guided slide a rigid tracer arm 80 is rigidly secured thereto. Said arm 80 extends longitudinally toward the left so that its outer end overlies the table 16. The arm 80 has a vertical aperture in its outer end and a hollow plunger 82 fits this aperture and is vertically movable therein. The plunger at its lower end includes a conical centering point 84 which enters a conical opening in the disc 78 at the center of the top thereof. The centering point is connected with the main body of the plunger by means of a sleeve 86 formed of insulating material. When the axis of the tool 62 is movable in a vertical transverse plane extending through the axis of rotation of the table 20, the arm 80 is so constructed and positioned that the axis of the tracer disc 78 is movable in a vertical longitudinal plane extending through the axis of rotation of the table 16. As shown, the tracer disc is at the right of the axis of the table. The action of gravity holds the point 84 in engagement with the disc 78 but gravity may be supplemented by a coil spring 88. A conductor wire 90 is electrically connected with the centering point 84 and extends through the plunger 82 and through an insulating bushing 92 at the top thereof.

When the table 16 is rotated, the tracer disc 78 remains generally stationary except that it moves longitudinally with the slide 40 in accordance with the contour of the pattern 70. However, the plunger 82 permits slight upward and downward movements of the disc to compensate for possible variation in the table top from its normal horizontal plane of rotation and to compensate for possible variations in the thickness of the drawing sheet 68.

Figures 2, 3:
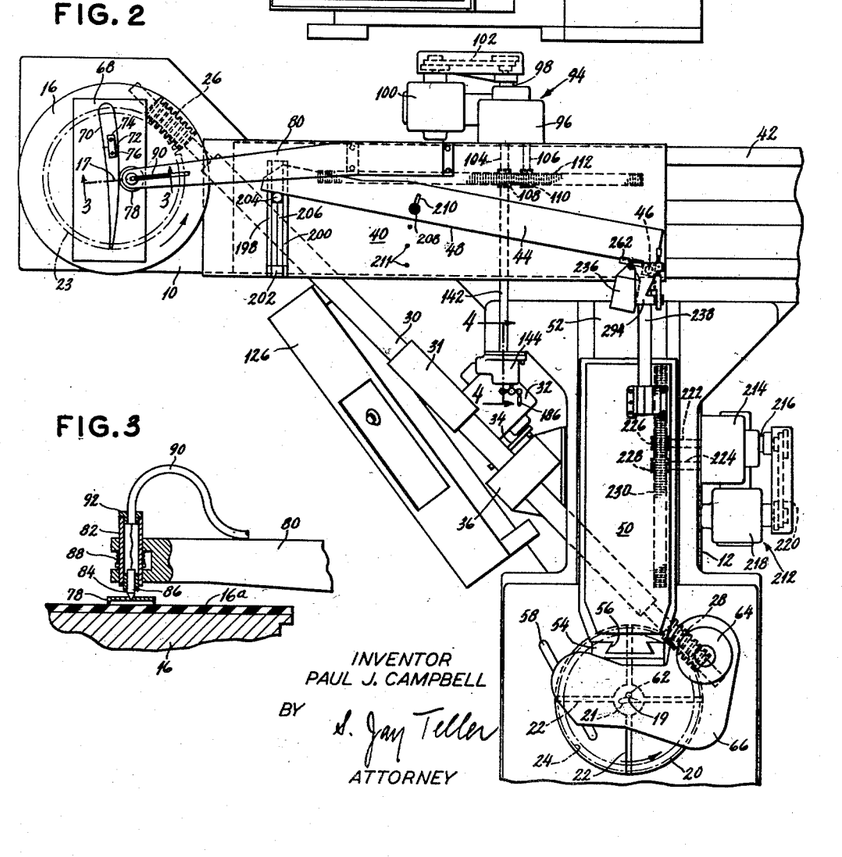
Fig. 2 is a plan view.
Fig. 3 is an enlarged fragmentary vertical sectional view taken along the line 3–3 of Fig. 2.

For longitudinally moving the slide 40 and the parts carried thereby to enable the tracer disc 78 to follow the contour of the pattern, there is provided a mechanism indicated generally at 94 in Fig. 2. This mechanism comprises a gear and clutch box 96 secured to the bed portion 10 at the rear thereof. Power is supplied to the box 96 through an input shaft 98 from an electric motor 100 by means of a belt 102. Extending transversely from the box 96 are two output shafts 104 and 106 which respectively carry pinions 108 and 110. Said pinions mesh with a longitudinal rack 112 which is above the pinions and which is secured to the bottom of the slide 40. The box 96 contains two oppositely rotating continually operative first and second magnetic clutches 114 and 116 (shown only in Fig. 11) together with gearing therefor, said clutches tending to rotate the pinions 108 and 110 in opposite directions. The movement of the slide 40 in one direction or the other is dependent upon the prevalence of the torque of one clutch over that of the other. The details of the clutches and of the gearing therefor are not fully shown as they are or may be exactly the same as disclosed in my said Patent 2,677,311, more particularly as shown in Figs. 6 to 11 thereof and as described in connection therewith.

For convenience of description but without limitation, it will be assumed that the first clutch 114 tends to rotate the pinion 108 in the clockwise direction as viewed from the front and thus tends to move the slide 40 toward the right, and that the second clutch 116 tends to rotate the pinion 110 in the counter-clockwise direction as viewed from the front and thus tends to move the slide 40 toward the left.

Figure 1:
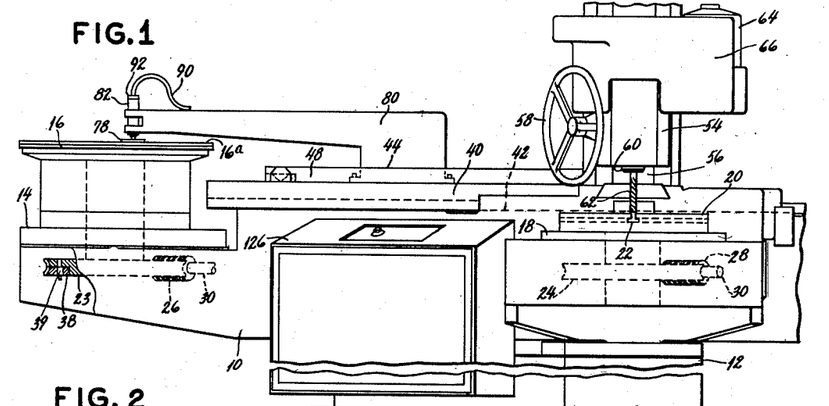
Fig. 1 is a front view of a machine embodying the invention.

It has been stated that a spark controlled means causes the conductive tracer to follow the conductive pattern. This will be more fully understood from Fig. 11 which is a simplified diagram of electrical connections. An electrical servo circuit 118 is provided which receives power through wires 120. The high voltage side of said circuit 118 is connected to the tracer disc 78 through the wire 90 and a resistor 122, said high voltage being derived through a resistor 123 from a wire 124. The low voltage side of the circuit 118 is grounded to the machine, being thus connected with the conductive pattern or line 70 through the previously described connections. The various parts comprising the circuit 118 and other electrical parts may be contained in a panel box 126, shown in Figs. 1 and 2. Said circuit 118 and said clutches 114 and 116 are or may be the same as shown in the panel marked "Clutch Control Circuit" in the upper left portion of Fig. 14 of my said Patent 2,677,311, wherein the present tracer 78 and pattern 70 are substituted for the prior tracer 60 and pattern 56 and wherein the present clutches 114 and 116 are substituted for the prior clutches 68 and 70.

During operation of the machine a relatively high direct current potential is continuously maintained across a minute gap between the tracer disc 78 and the pattern or conductive line 70. This potential, which for example may be of the order of approximately 1200 volts (open circuit voltage), is sufficient to cause a spark current to flow between the conductive tracer disc and the conductive pattern or line whenever they approach to within a predetermined distance. This distance or gap length, for a potential of the order of 1200 volts, is about .003". The current across the gap is maintained substantially continuously but the current varies as a function of the length of the gap, said length of the gap tending to increase or decrease as the pattern is rotated. When the contour of the pattern slightly decreases the length of the gap, the first clutch 114 drives the pinion 108 in the clockwise direction to immediately move the slide 40 and the tracer 78 toward the right so as to restore the spark gap length to normal. When the contour of the patten slightly increases the length of the gap, the second clutch 116 drives the pinion 110 in the counterclockwise direction to immediately move the slide 40 and the tracer 78 toward the left so as to again restore the spark gap length to normal. Thus the spark gap length is maintained within predetermined narrow limits.

As the result of the action of the spark controlled mechanism, the tracer disc is caused to almost exactly follow the contour of the pattern, the slide 40 moving toward the left and toward the right in accordance with said contour. The tool support and the tool holder are moved proportionately to the movement of the slide 40, thus reproducing on the workpiece a shape that is the same as or proportionate to the contour of the pattern. Preferably and as shown, the ratio bar 44 constitutes an essential element of the means for proportionately moving the tool support and the tool holder.

*Adjusting means for external and internal following*

As thus far described, it has been assumed that the tracer 78 is at the right of the immediately adjacent portion of the pattern. However, it is sometimes necessary or preferable to locate the tracer at the left of the immediately adjacent portion of the pattern, as for instance when the tracer is to follow the internal contour of a conductive line pattern. It will be obvious that, for internal following, the relationship between the contour of the pattern and the size of the tracer must be different from that shown. The internal radius of curvature of the pattern must in every instance be at least as large as the radius of the tracer. For convenience but without limitation, following at the right of the immediately adjacent portion of the pattern will be referred to as "external" and following at the left of the immediately adjacent portion of the pattern will be referred to as "internal."

Figure 11:
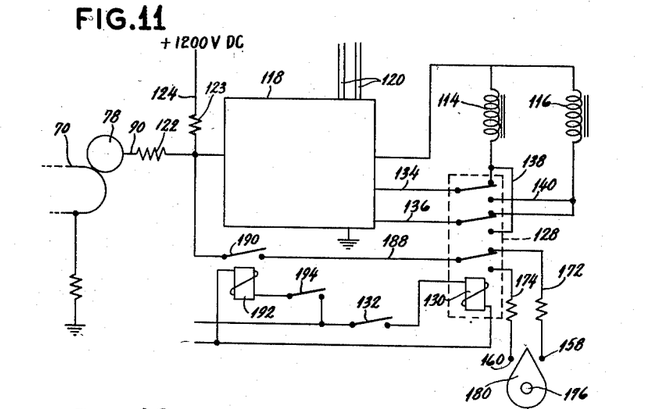
Fig. 11 is a simplified diagram of electrical connections for controlling the movement of the ratio bar slide.

As shown in Fig. 11, the clutches 114 and 116 are connected with the circuit through a relay switch 128 controlled by a solenoid 130 which may be energized by means of a normally open manual switch 132. When the solenoid is de-energized, as shown, the clutches are connected through wires 134 and 136 for external following. When the switch 132 is closed and the solenoid 130 is energized, the clutches are reversely connected through the wires 138 and 140 for internal following. With the clutches reversely connected, an increase in the legnth of the spark gap causes the slide 40 and the tracer 78 to move toward the right instead of toward the left, and a decrease in the length of spark gap causes the slide 40 and the tracer 78 to move toward the left instead of toward the right.

*Manually controlled means for longitudinally moving slide and ratio bar*

For effecting manually controlled movements of the slide 40 and ratio bar 44, the mechanism 94 and the servo circuit 118 are utilized, but their control is manual rather than automatic. For manual control there is provided a means including cooperating electrodes between which a second short spark gap is established, this second spark gap being in a circuit parallel with the circuit for the first spark gap between the tracer and the pattern. There is a manually operable means for moving one of the last said electrodes relatively to the other to vary the length of the second spark gap and to thus cause the mechanism 94 to move the slide 40. As to details, the manual control means may be widely varied, but the presently preferred construction will now be described.

Figures 4, 5, 6, 7:
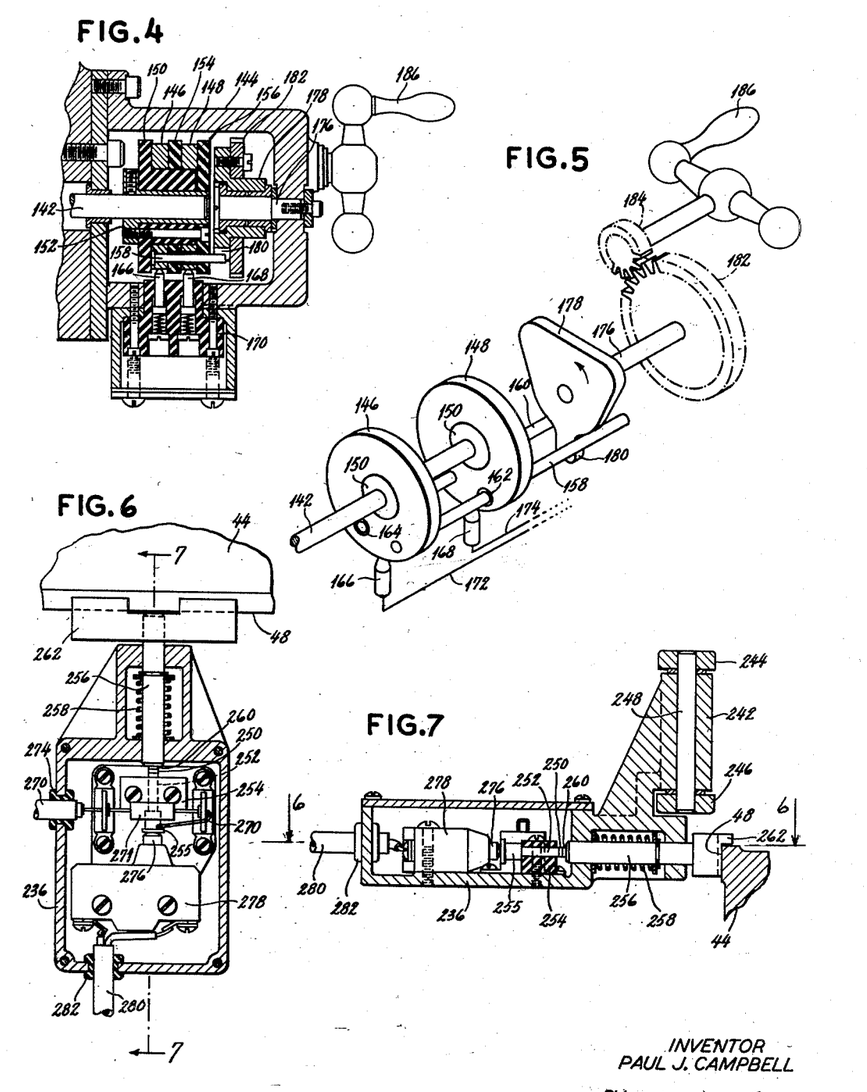
Fig. 4 is an enlarged fragmentary sectional view taken along the line 4–4 of Fig. 2.
Fig. 5 is a schematic perspective view of some of the parts shown in Fig. 4.
Fig. 6 is an enlarged horizontal sectional view of a portion of the spark controlled mechanism for moving the cross slide, this view being taken along the line 6–6 of Fig. 7.
Fig. 7 is a vertical sectional view taken along the line 7–7 of Fig. 6.

A transverse shaft 142 is connected with one of the output shafts of the box 96, and said shaft 142 is shown as connected with the output shaft 104. The shaft 142 extends into a gear box 144 located within convenient reach of the operator of the machine. The details of the gear box and of the parts therein are shown in Figs. 4 and 5.

Secured to the shaft 142 within the box 144 are two similar slip rings 146 and 148. The rings are carried by a flanged sleeve 150 of insulating material which in turn is carried by a flanged sleeve 152 secured to the shaft 142. An insulating spacer 154 is provided between the rings and an insulating ring 156 is provided at the right of the ring 148. The insulating ring 156 is forced toward the left by screws so that both slip rings are securely clamped. Two metal pins 158 and 160 extend through the rings 146 and 148 and project toward the right. The pin 158 is electrically connected with the ring 146 and is insulated from the ring 148 by a bushing 162. The pin 160 is electrically connected with the ring 148 and is insulated from the ring 146 by a bushing 164.

Spring pressed brushes 166 and 168 are engaged respectively with the slip rings 146 and 148, these brushes being suitably insulated from each other and from the metal of the box 144 by a supporting block 170. Wires 172 and 174 serve respectively to connect the brushes 166 and 168 and the pins 158 and 160 with the circuit 118. The connections are hereinafter more fully described.

A pivot stud 176 is carried by the end wall of the box 144, the axis of the stud being in alignment with the axis of the shaft 142. Rotatable on the stud 176 is a metallic member 178, this member having a finger 180 which extends between the pins 158 and 160. It will be understood that the member 178 is electrically grounded. Secured to the member 178 is a gear 182 which meshes with a pinion 184 rotatable by a handle 186. The pin 158 and the finger 180 and the pin 160 are sometimes referred to respectively as "first," "second" and "third" electrodes.

Said wires 172 and 174 are connectible with the circuit 118 through contacts on the relay switch 128. When the switch is in the position shown for external following, the wire 172 is connected to a wire 188. When the switch 128 is in the position for internal following, the wire 174 is connected with said wire 188. The wire 188 is connectible with the high voltage wire 124 through a normally open relay switch 190 controlled by a solenoid 192 which may be energized by a manual switch 194. When the switch 190 is open, the manual control means is inoperative, but when the switch 190 is closed movement of the slide may be effected by the manual means.

Assuming that the switch 190 is closed and that the switch 128 is set for external following, which is the more usual practice, a connection is established through the wire 172 to the brush 166 and the ring 146 and the pin or first electrode 158. The operation of the manually operable mechanism is then as follows. If it is desired to move the table 40 toward the right, the handle 186 is turned in the counterclockwise direction, as viewed from the right in Figs. 4 and 5, the member 178 being thus moved in the clockwise direction. The finger or second electrode 180 tends to move toward the first electrode 158, a second spark gap being established between the second and first electrodes. The circuit for this second spark gap is in parallel with the circuit for the first spark gap between the tracer and the pattern and the second spark gap has exactly the same function as the first spark gap. As the finger or second electrode 180 approaches the pin or first electrode 158, the length of the second spark gap tends to be reduced below the normal length, which as before stated may be about .003", and the table is moved toward the right exactly as previously described. As the table moves toward the right the shaft 142 is rotated in the clockwise direction and the pin or first electrode 158 tends to move away from the finger or second electrode 180. However, if the rotative movement of the second electrode is continued, a length of the second spark gap is maintained within the prescribed limits and the mechanism 94 serves to move the slide toward the right at a speed proportionate to the speed of movement of the finger or second electrode.

The action is similar when it is desired to move the table toward the left. The direction of rotation of the handle 186 is reversed and the finger or second electrode 180 tends to move away from the pin or first electrode 158. The length of the second spark gap tends to be increased and the slide is moved toward the left, but the movement of the slide rotates the pin or first electrode 158 in the counterclockwise direction so that it tends to move toward the finger or second electrode 180. However, if the rotative movement of the second electrode is continued, the length of the second spark gap is maintained within the prescribed limits and the mechanism 94 serves to move the slide toward the left at a speed proportionate to the speed of movement of the finger. The mechanism 94 with its control circuit acts as a servo mechanism for moving the slide 40, the handle 186 being required to apply only a minimum pressure or force.

When the switch 128 is set for internal following, a connection is established through the wire 174 to the brush 168 and the ring 148 and the pin or third electrode 160. The operation is substantially the same as previously described except that an alternate second spark gap is between the finger or second electrode 180 and the pin or third electrode 160 in lieu of the before described second spark gap between the said second electrode and said first electrode.

The circuit for the spark gap at the tracer might be interrupted when the circuit for the second spark gap is established. Preferably, however, the circuit for the first spark gap is maintained as shown in Fig. 11. It will be apparent that, even when the manual control is connected, the automatic control by the pattern 70 is still to some extent effective. Assuming setting for external following, it will be apparent that when the length of the second spark gap at the first electrode 158 is reduced the slide 40 is moved toward the right so as to separate the tracer disc 78 from the pattern. When the disc 78 is separated from the pattern, the slide can be manually moved toward the left by increasing the length of the second spark gap at the first electrode 158, but when the disc 78 approaches the pattern and there establishes a first spark gap of normal length, the longer second gap at the first electrode 158 no longer controls. In preparing the machine for operation the slide can be rapidly moved manually so that the disc 78 assumes its proper relationship with the pattern and the pattern then automatically assumes control and prevents the manual means from causing any overtravel of the disc.

*Ratio bar adjustment*

As has been stated, the ratio bar 44 is pivoted to the table for movement about a vertical axis at 46 at the right, and said bar can be adjusted to any angle up to a prescribed maximum.

A suitable gage 198 is provided for determining the angle of the ratio bar. As shown, the gage includes a V-shaped transverse trough 200 which extends partly beneath the left portion of the sine bar. The trough has a front wall 202 so located that the front edge of the bar is exactly parallel with the direction of table movement when a ball 204 of known diameter is in the trough and engages the wall 202 and the front wall 48 of the bar. To adjust the bar to a desired angle, the bar is moved and gage blocks 206 having a predetermined aggregate thickness are placed between the wall 202 and the ball 204. The bar is then adjusted so that its front edge 48 engages the ball, the bar then being at an angle the tangent of which is the ratio between the thickness of the blocks 206 and the distance between the axis 46 and the center of the trough 200. By means of a bolt 208 in a slot 210 the ratio bar can be clamped in its adjusted position. Additional holes 211 are provided in the table 40 so that the ratio bar can be adjusted to an extent greater than that provided by the slot 210.

As illustrated, the ratio bar is adjusted to an angle of about 10° for a size reduction of 6 to 1.

*Ratio bar controlled means for transversely moving cross slide and cutting tool*

The cross slide 50 and the cutting tool 62 carried thereby are moved transversely, that is, forwardly and rearwardly under the control of the inclined longitudinally movable ratio bar 44, and the cross slide and cutting tool are preferably so moved by a spark controlled means generally similar to the spark controlled means for moving the slide 40 under the control of the pattern.

The cross slide 50 is moved forwardly and rearwardly by a mechanism 212 which is or may be identical in construction with the mechanism 94 for moving the slide 40, except that the motor is in a different relative position. The mechanism 212 comprises a gear and clutch box 214 secured to the bed portion 12 at the right side thereof. Power is supplied to the box 214 through an input shaft 216 from an electric motor 218 by means of a belt 220. Extending longitudinally from the box 214 are two output shafts 222 and 224 which respectively carry pinions 226 and 228. Said pinions mesh with a longitudinal rack 230 which is above the pinions and which is secured to the bottom of the cross slide 50. The box 214 contains two oppositely rotating continually operative magnetic clutches 232 and 234 (shown only in Fig. 12) together with gearing therefor, said clutches tending to rotate the pinions 226 and 228 in opposite directions. The movement of the cross slide 50 forwardly or rearwardly is dependent upon the prevalence of the torque of one clutch over that of the other. For convenience of description but without limitation, it will be assumed that the clutch 222 tends to rotate the pinion 226 in the counterclockwise direction as viewed from the left and thus tends to move the cross slide rearwardly, and that the clutch 224 tends to rotate the pinion 228 in the clockwise direction as viewed from the left and thus tends to move the cross slide forwardly.

Provision is made for a spark gap at an electrode in normally fixed relationship with the cross slide 50, said spark gap tending to vary in length as the main slide and ratio bar are longitudinally moved. When the ratio bar 44 is moved toward the right said bar tends to move away from said electrode and the spark gap tends to lengthen, whereupon the mechanism 212 moves the cross slide and the tool holder rearwardly to restore the spark gap length to normal. When the ratio bar 44 is moved toward the left, said bar tends to move toward said electrode and the spark gap tends to shorten, whereupon the mechanism 212 moves the cross slide and the tool holder forwardly to restore the spark gap length to normal. As the result of the action of the spark controlled mechanism, the cross slide 50 and the parts carried thereby are moved rearwardly and forwardly in exact conformity with movements of the main slide toward the right and toward the left. The cross slide and the tool holder move to lesser extents according to the angle of inclination of the ratio bar.

The means for providing the spark gap of variable length may be widely varied, but the presently preferred means will now be described. Said spark gap means is located within or carried by a control box 236 which, during operation of the machine, is in fixed relationship with the cross slide 50, preferably being carried by a cylindrical bar 238 extending rearwardly from said cross slide. The box 236 is shown in Fig. 2 and in Figs. 6 to 11. During use of the machine the ratio bar 44 is always in an inclined position, but for convenience of illustration the ratio bar is shown in Figs. 6 to 11 as being in its parallel position and other parts are correspondingly positioned.

The box 236 is connected to the bar 238 by means of a bracket 240 carried by said bar near the rear end thereof, the bracket being connected with the bar in a manner to be more fully described. Preferably the box 236 is connected for pivotal movement about a vertical axis. When the box is pivotally connected, it is provided at the rear thereof with an upstanding hinge lug 242 and the bracket 240 is provided with ears 244 and 246 located respectively above and below the lug 242. The said lug and the said ears are apertured to receive a vertical pivot pin 248. Thus the box 236 is supported entirely by the bracket 240, and the box is movable relatively to the bracket about a vertical axis which is the axis of the pin 248. The box 236 is so located that at least a portion thereof is directly in front of the ratio bar 44.

Located within the box 236 is the cross slide electrode at which the spark gap is formed, this electrode being shown at 250 and being sometimes hereinafter designated as the "first cross slide electrode." As shown, the electrode 250 is at the rear end of a rod 252 which is carried by a block 254 of insulating material. Preferably, for reasons to be set forth, the rod 252 is a movable plunger having an enlarged portion 255 which abuts against the block 254 to limit rearward movement.

Fitting in suitable apertures in the rear portion of the box 236 is a plunger 256 which is biased rearwardly by a spring 258. The plunger 256 at the rear thereof carried an electrode 260 which is in close proximity to the electrode 250, said electrode 260 being sometimes hereinafter designated as the "second cross slide electrode." When the box 236 is pivotally movable, the axis of the plunger 256 intersects the pivotal axis of the box at 248. Secured to the plunger 256 is a head 262 having a face which engages the flat front face 48 of the ratio bar 44. Preferably the said face on the head 262 is flat and is perpendicular to the plunger. The spring 258 maintains the head 268 in engagement with the ratio bar, and the flat perpendicular face of the head serves to maintain the box 236 in an inclined position corresponding to the inclination of the ratio bar, as illustrated in Fig. 2. The head 262 always engages the ratio bar notwithstanding small forward and rearward movements of the box 236 as hereinafter explained.

It will be observed that said electrodes 250 and 260 are fixed against longitudinal movement with the main slide and the ratio bar, but said electrodes are movable transversely. The plunger 250 and the parts immediately associated therewith constitute means for carrying the first electrode 250 in normally fixed relationship with the cross slide for movement transversely therewith. The head 262 and the plunger 256 and the spring 258 collectively constitute means for maintaining said second cross slide electrode 260 in fixed relationship with the inclined face of the ratio bar, said electrode 260 being moved transversely in accordance with the inclination of the ratio bar. Said second electrode 260 is transversely movable to only a very limited extent relatively to the first electrode 250, but both electrodes are movable transversely in approximate unison to a substantial extent. The electrodes 250 and 260 may engage each other but during operation of the machine they are normally spaced apart to provide a very short gap between them.

Figure 12:
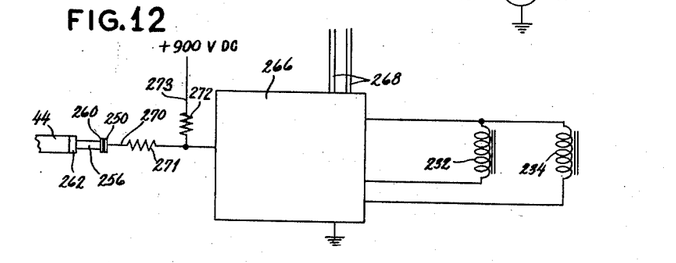
Fig. 12 is a simplified diagram of electrical connections for controlling the movement of the cross slide.

As shown in Fig. 12, an electrical servo circuit 266 is provided which receives power through wires 268. The high voltage side of said circuit 266 is connected to the contact 250 through a wire 270 and a resistor 271, said high voltage being derived through a resistor 272 from a wire 273. As shown in Fig. 6, the wire 270 extends through a bushing 274 in one side of the box 236. The low voltage side of the circuit is grounded to the machine, being thus connected with the electrode 260 through the plunger 256 which carries it. Thus the first and second cross slide electrodes are connected in an electric circuit including a short spark gap between said electrodes, the length of said gap preferably being about .001". Said circuit 266 and the clutches 232 and 234 may be the same as the circuit 118 and the clutches 114 and 116 shown in Fig. 11 and previously described.

With the parts in the positions shown, it may be assumed that the electrodes 250 and 260 are spaced apart by a spark gap of about .001" and that the mechanism 212 for moving the cross slide is idle. When the shape of the pattern results in movement of the slide 40 and the ratio bar 44 toward the right, the inclined face of said bar tends to move away from the head 262. However, the ratio bar does not actually move away from the head as the spring 258 maintains contact with the result that the electrode 260 moves rearwardly and there is an increase in the length of the spark gap between the two electrodes 250 and 260. This increase in the length of the spark gap causes the clutch 232 to rotate the pinion 226 in the counterclockwise direction so as to move the cross slide rearwardly and to thus restore the spark gap length to normal. When the shape of the pattern results in the movement of the slide 40 and the ratio bar 44 toward the left, the inclined face of said bar pushes the head 262 forwardly relatively to the box 236 with the result that the electrode 260 moves forwardly and there is a decrease in the length of the spark gap between the two electrodes 250 and 260. This decrease in the length of the spark gap causes the clutch 234 to rotate the pinion 228 in the clockwise direction so as to move the cross slide forwardly and to thus again restore the spark gap length to normal.

It will therefore be seen that, as the slide 40 and the ratio bar 44 move transversely toward the right and toward the left, the cross slide is moved rearwardly and forwardly to proportionate extents, the ratio of the cross slide movements being determined by the angular setting of the ratio bar. The movements of the cross slide are effected by the ratio bar indirectly through the spark controlled mechanism and the ratio bar is therefore not subjected to wear or to any mechanical stress or pressure for effecting movements of the cross slide.

*Safety means operable in event of failure of cross slide movement*

If there should be any failure of the mechanism 212 to move the cross slide 50 rearwardly in proportion to the movement of the slide 40 and of the ratio bar toward the right, no serious damage could result although the workpiece 26 might be damaged. However, serious damage could result from any failure of the mechanism 212 to move the cross slide forwardly in proportion to the movement of the slide 40 and of the ratio bar toward the left. If there should be any failure as last stated, the ratio bar would be forcibly pressed against the head 262 and the box 236 and said parts would be required to carry the load of mechanically moving the cross slide forwardly. The ratio bar and the parts associated with the box are not intended or designed for such load and various parts might be seriously damaged.

Preferably a safety means is provided for immediately stopping at least the traverse motor 100, and preferably also the traverse motor 214, in the event that the mechanism 212 fails to move the cross slide 50 forwardly in proportion to the movement of the slide 40 and of the ratio bar toward the left. By preference the table motor 32 is also stopped. The safety means may be widely varied but it preferably serves to stop one or more of the said motors when the spark gap is completely closed and when the first cross slide electrode is thereupon moved forwardly by the ratio bar.

Figure 13:
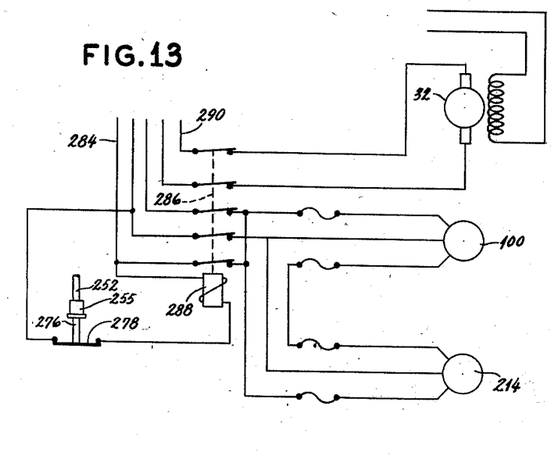
Fig. 13 is a simplified diagram of electrical connections for certain motors.

One suitable safety means is shown in Figs. 6 and 13 and this will now be described. It has been stated that the enlarged portion 255 of the plunger 252 limits movement of the said plunger in the rearward direction. The plunger 252 is biased in the forward direction and is normally held in its forward position by spring-pressed plunger 276 forming a part of a limit switch 278. The plunger 276 is formed of insulating material or is otherwise insulated from the plunger 252. Connecting wires 280 for the switch 278 extend through a bushing 282 in the front of the box 256. In the event of failure of the cross slide to move forwardly, the electrode 260 comes into full contact with the electrode 250 and the plunger 252 is pushed forwardly. In moving forwardly the plunger 252 moves the plunger 276 forwardly to actuate the switch 278 which is connected with a suitable relay for stopping the motors.

A schematic diagram of electrical connections is shown in Fig. 13. The motors 100 and 214 are shown as being connected with power leads 284 through a normally closed relay switch 286 controlled by a solenoid 288. The solenoid 288 is connected in series with the switch 278 which is assumed to be normally closed. When the plunger 276 is moved forwardly by the plunger 252 as above stated, the switch 278 is opened to de-energize the solenoid 288 and open the switch 286 so as to stop the motors 100 and 214. As shown, the table motor 32 is connected with power leads 290 through other contacts of the switch 286. When the motor 32 is so connected, it is stopped simultaneously with the motors 100 and 214.

Figures 8, 9, 10:
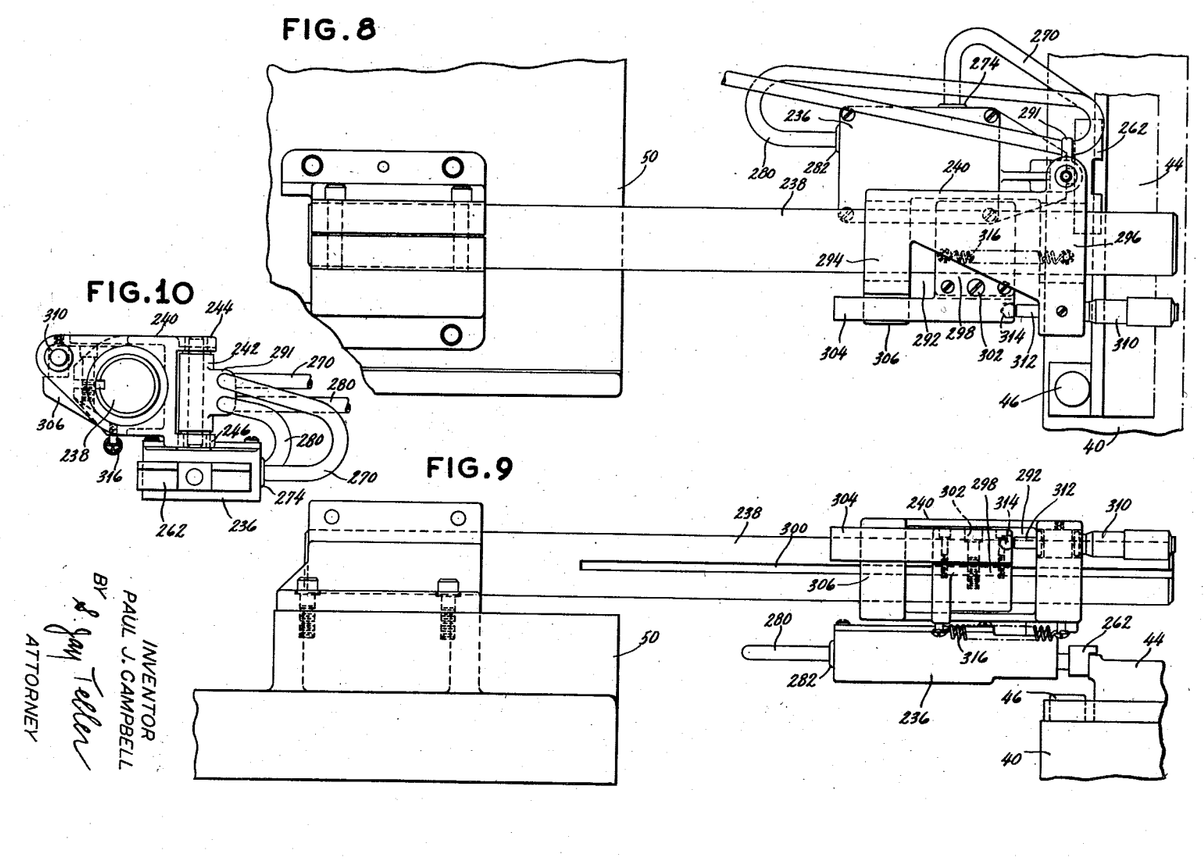
Fig. 8 is an enlarged plan view of the upper right portion of the machine with the ratio bar in its parallel position and with other parts correspondingly located.
Fig. 9 is a right side view of the parts shown in Fig. 8.
Fig. 10 is a rear view of the parts shown in Figs. 8 and 9, but with the ratio bar omitted.

Preferably the bearing lug 242 for the box 236 is provided with a vertical flange 291 having apertures through which the looped wires 270 and 280 extend. This is best shown in Figs. 9 and 10. By holding the wires relatively close to the pivotal axis, there is little or no tendency for the wires to prevent or resist pivotal movement of the box 236.

*Cross slide adjusting means*

A manually controlled means is provided for causing the mechanism 212 to effect forward and rearward movements of the cross slide, such movements being supplemental to the normal control of the cross slide by the ratio bar. To this end the bracket 240 is adjustable relatively to the cross slide and a manually controlled device is provided for effecting forward and rearward movements of said bracket along the bar 238. Relative rearward movement of the bracket moves the electrode 250 rearwardly and reduces the length of the spark gap and therefore causes the mechanism 212 to move the cross slide forwardly. Relative forward movement of the bracket moves the electrode 250 forwardly and increases the length of the spark gap and therefore causes the mechanism 212 to move the cross slide rearwardly. This relative movement of the bracket effects forward or rearward movement of the cross slide as desired.

Preferably said bracket 240 is not only movable lengthwise along the bar 238 but it is also free for limited rotative movement thereon. As shown, the bracket 240 has a chamber 292 therein between end walls 294 and 296. Located within the chamber 292 and between said end walls is a locating member 298 which surrounds the bar 238 and is adjustable lengthwise thereon. The member 298 is provided with a key which enters a slot 300 in the bar 238 to prevent the said member from turning. The member 298 is split and after adjustment lengthwise along the bar it may be clamped in adjusted position by means of a screw 302.

Secured to the member 298 at the right side thereof is a preferably rectangular bar 304 which is parallel to the bar 238. The front portion of the bar 304 is at the right side of the front end wall 294 of the bracket 240 and said end wall has a lip 306 which underlies said bar and engages the bottom thereof. The weight of the box 236 and the associated parts tends to rotate the bracket 240 in the counterclockwise direction as viewed from the front, but rotation is prevented by engagement of the lip 306 with the bar 304.

The rear end wall 296 of the bracket 240 has a projection which extends toward the right. This projection is apertured to receive the barrel of a micrometer 310 which is so positioned that its spindle 312 extends forwardly and is engageable with the rear end face of the bar 304 or with a ball 314 in a recess in said rear face. A tension spring 316 connects the bracket 240 with the locating member 298 and serves to move said bracket forwardly to the extent permitted by the micrometer.

In setting up the machine the bracket 240 and the locating member 298 are manually moved along the bar 238 to positions approximating their final positions. The member 298 is spaced from the bracket end walls 294 and 296 and the spring 316 biases the bracket 240 forwardly so that the spindle of the micrometer engages the end of the bar 304.

The micrometer 310 is utilized to move the bracket 240 rearwardly or forwardly relatively to the locating member 298 until said bracket reaches the position corresponding to the required position of the cutting tool 62 for machining the workpiece 26 to its proper size. If the cross slide and the tool are to be moved forwardly, the micrometer spindle is turned in the direction to move the bracket 240 relatively rearwardly. As the bracket moves rearwardly, the box 236 is also moved rearwardly with a resultant decrease in the length of the spark gap between the electrodes 250 and 260. This causes the mechanism 212 to move the cross slide and the tool forwardly in the manner previously described, the forward movement of the slide serving to restore the spark gap length to normal. If the cross slide and the tool are to be moved rearwardly, the micrometer spindle is turned in the direction to move the bracket 240 relatively forwardly. As the bracket moves forwardly, the box 236 is also moved forwardly with a resultant increase in the length of the spark gap. This causes the mechanism 212 to move the cross slide and the tool rearwardly in the manner previously described, the rearward movement of the slide serving to again restore the spark gap length to normal.

It will be apparent that the micrometer serves as a means for effecting the movement of the cross slide and the tool forwardly or rearwardly as required at a speed proportionate to the speed of movement of the micrometer spindle and to any extent within the range of movement of the bracket 240 relatively to the locating member 298. The mechanism 214 with its control circuit acts as a servo mechanism for moving the cross slide, the micrometer being required to apply only a minimum pressure or force. For an adjustment beyond the above-mentioned range it is necessary to move the locating bracket 298 along the bar 198.

The scale of the micrometer 310 may be used when required to accurately measure the extent of forward or rearward adjustment of the cross slide and cutting tool. For instance, roughing and finishing cuts are sometimes required, and the micrometer can be used to move the cross slide and the tool relatively forwardly to an exactly predetermined extent after a roughing cut.

GENERAL SUMMARY

From the foregoing description it will be apparent that the main slide 40 and the ratio bar 44 are moved longitudinally in accordance with the contour of a pattern on the rotating table 16. The pattern is ordinarily conductive and it may be a conductive line 70 on a drawing sheet. The slide 40 is moved by means electrically responsive to the length of a spark between the conductive tracer 78 and the conductive pattern 70.

The cross slide 50 and the cutting tool are moved forwardly and rearwardly under the control of the ratio bar 44, the forward and rearward movements of the cross slide and the tool being exactly proportionate to the movements of the main slide toward the left and toward the right. The movements of the cross slide and the tool are effected by means electrically responsive to the length of a spark at a contact movable with said cross slide. The net result is that the cutting tool cuts the workpiece to a shape that is the same as or proportionate to the contour of the pattern.

The machine as shown and described is well adapted for the practice of the method set forth in my said Patent No. 2,677,310, wherein contours different in shape or in angular relationship or in both can be cut at different planes on the workpiece by providing successive conductive line drawings wherein the contours are different in shape or in position or in both.

The invention claimed is:

1. In a machine for shaping a workpiece with a contour determined by the contour of a pattern, the combination of first and second tables rotatable about horizontally spaced vertical axes, said first table having a flat horizontal top face adapted for supporting a drawing sheet having a conductive line thereon constituting a pattern, means adapted for providing an electrical connection to a conductive line on a drawing sheet such as aforesaid on said first table, means connected with said tables for rotating them relatively slowly and in unison, a tracer guide movable toward and from said first table, a circular electrically conductive tracer disc having a central conical opening in the top thereof which disc is adapted to rest upon a drawing sheet on said face of said first table and to follow the contour of a conductive line on such a drawing sheet, a vertically movable downwardly biased plunger carried by the tracer guide which plunger has a pointed portion entered in the conical opening in said tracer disc for preventing any horizontal movement of the disc relatively to the guide, means for connecting the tracer disc in an electric circuit including a short spark gap between the tracer and a conductive line on a drawing sheet on the face of said first table which gap during the said relative movement between the tracer and a conductive line on such a drawing sheet tends to vary in length in accordance with the contour of said conductive line, means electrically responsive to variations in the length of the said spark gap for moving the tracer and tracer guide so as to maintain the said gap length within predetermined narrow limits and so as to thus cause the tracer to follow the contour of a conductive line on a drawing sheet on the face of said first table, a tool support guided for movements toward and from the second table, a tool holder carried by the tool support and adapted to hold a tool for engaging and cutting a workpiece carried by and rotatable with the second table, and means controlled by the movements of the tracer and tracer guide for causing proportionate movements of the tool support and tool holder so that a workpiece on said second table is shaped proportionately to the contour of a conductive line on a drawing sheet on said first table.

2. In a machine for shaping a workpiece with a contour determined by the contour of a pattern, the combination of first and second tables rotatable about horizontally spaced vertical axes, means connected with said tables for rotating them relatively slowly and in unison, means on the first table adapted for holding an electrically conductive pattern and adapted for providing an electrical connection with such a pattern, a main slide guided for longitudinal movements toward and from said first table, an electrically conductive tracer connected with the slide and adapted to follow the contour of a conductive pattern on said first table, means for connecting the tracer in an electric circuit including a short spark gap between the tracer and a pattern on said first table which gap during the said relative movement between the tracer and such a pattern tends to vary in length in accordance with the contour of said pattern, means electrically responsive to variations in the length of the said spark gap for moving the tracer and main slide longitudinally so as to maintain the said gap length within predetermined narrow limits and so as to thus cause the tracer to follow the contour of such a pattern on said first table, a ratio bar on the slide having a face inclined at an angle to the direction of slide movement, a cross slide guided for transverse movements toward and from the second table, a tool holder carried by the cross slide and adapted to hold a tool for engaging and cutting a workpiece carried by and rotatable with the second table, and means controlled by the inclined face of the ratio bar for causing transverse movements of the cross slide and tool holder which are proportionate to the longitudinal movements of the tracer and slide and ratio bar so that a workpiece on said second table is shaped proportionately to the contour of a pattern on said first table.

3. A machine as set forth in claim 2, wherein the first table has a flat horizontal top face, wherein the tracer is a circular disc having a central conical opening in the top thereof which disc is adapted to rest upon said table face or upon a drawing sheet thereon, wherein a rigid arm is attached to the slide and projects over said first table, and wherein there is a vertically movable downwardly biased plunger carried by the projecting portion of the arm which plunger has a pointed portion entered in the conical opening in said tracer disc for preventing any horizontal movement of the disc relatively to the arm and slide.

4. In a machine for shaping a workpiece with a contour determined by the contour of a pattern, the combination of first and second tables rotatable about horizontally spaced vertical axes, means connected with said tables for rotating them relatively slowly and in unison, means on the first table adapted for holding an electrically conductive pattern and adapted for providing an electrical connection with such a pattern, a tracer guide movable toward and from said first table, an electrically conductive tracer connected with said tracer guide and adapted to follow the contour of a conductive pattern on said first table with the tracer at one side of the immediately adjacent portion of such a pattern or at the opposite side of said immediately adjacent portion, means for connecting the tracer in an electric circuit including a short spark gap between the tracer and such a pattern on said first table which gap during the said relative movement between the tracer and a pattern on said first table tends to vary in length in accordance with the contour of such a pattern, means electrically responsive to variations in the length of the said spark gap for moving the tracer and tracer guide longitudinally so as to maintain said gap length within predetermined narrow limits when the tracer is at the first said side of the immediately adjacent portion of such a pattern on said first table and so as to thus cause the tracer to follow the contour of such a pattern at the first said side thereof, means for reversing the electrically responsive action of said electrically responsive means so as to maintain said spark gap length within predetermined limits when said tracer is at said opposite side of said immediately adjacent portion of such a pattern and so as to thus cause the tracer to follow the contour of such a pattern at said opposite side, a tool support guided for movements toward and from the second table, a tool holder carried by the tool support and adapted to hold a tool for engaging and cutting a workpiece carried by and rotatable with the second table, and means controlled by the movements of the tracer and tracer guide for causing proportionate movements of the tool support and tool holder.

5. A machine as set forth in claim 4, wherein the electrically responsive means includes first and second rotatable magnetic clutches connected to said tracer guide and respectively applying force thereto for moving it in opposite directions, wherein when the tracer is at said selected side of the immediately adjacent portion of a pattern such as set forth said first clutch moves the tracer guide away from such a pattern upon decrease in the spark gap length and said second clutch moves the tracer guide toward such as pattern upon increase in the spark gap length, and wherein means is included for reversing the spark gap control of the clutches so that when the tracer is at said opposite side of the immediately adjacent portion of such a pattern said first clutch moves the tracer guide toward the pattern upon decrease in the spark gap length and said second clutch moves the tracer guide away from the pattern upon increase in the spark gap length.

6. In a machine for shaping a workpiece with a predetermined contour, the combination of first and second tables rotatable about horizontally spaced vertical axes, means connected with said tables for rotating them relatively slowly and in unison, means on the first table adapted for holding an electrically conductive pattern and adapted for providing an electrical connection with such a pattern, a main slide guided for longitudinal movements toward and from said first table, an electrically conductive tracer connected with the slide and adapted to follow the contour of such a conductive pattern on said first table, electrical connections adapted for connecting the tracer in an electric circuit including a short spark gap between the tracer and a pattern on said first table which gap during the said relative movement between the tracer and such a pattern tends to vary in length in accordance with the contour of such a pattern, means electrically responsive to variations in the length of the said spark gap for moving the tracer and slide longitudinally so as to maintain the said gap length within predetermined narrow limits and so as to thus cause the tracer to follow the cotour of such a pattern on said first table, a tool support guided for movements toward and from the second table, a tool holder carried by the tool support and adapted to hold a tool for engaging and cutting a workpiece carried by and rotatable with the second table, means controlled by the movements of the tracer and tracer guide for causing proportionate movements of the tool support and tool holder, means including first and second electrodes and electrical connections adapted for establishing a second short spark gap between said electrodes separate from the first said spark gap, the electrical connections for the second spark gap being in parallel with the electrical connections for the first spark gap, and manually operable means for moving said second electrode relatively to said first electrode to vary the length of the second spark gap within said predetermined limits and to thus cause said electrically responsive means to move the tracer and slide longitudinally in one direction or the other when the length of the second spark gap is increased or decreased.

7. A machine as set forth in claim 6, wherein means is provided for mechanically connecting the first electrode with the slide for movement in a fixed path and to an extent proportionate to the extent of slide movement, and wherein means is provided for manually moving the second electrode in a fixed path similar to and immediately adjacent the path of the first electrode.

8. A machine as set forth in claim 6, wherein the tracer is adapted to follow a pattern such as set forth on said first table at one side of the immediately adjacent portion of such a pattern or at the opposite side of the immediately adjacent portion of such a pattern, wherein means is provided for reversing the electrically responsive action of said electrically responsive means so as to maintain said spark gap length within predetermined limits when said tracer is at the first said side of the immediately adjacent portion of such a pattern or at the opposite side of said immediately adjacent portion of such a pattern, wherein means is provided including a third electrode similar to and in fixed relation to said first electrode and also including electrical connections adapted for establishing a second spark gap between the second and third electrodes, and wherein means is connected with said means for reversing the electrically responsive action for establishing an electrical connection to the first electrode or the third electrode according to the position of said reversing means.

9. A machine as set forth in claim 8, wherein means is provided for mechanically connecting the first and third electrodes with the slide for uniform movement in fixed paths and to an extent proportionate to the extent of slide movement, wherein the second electrode is located between the first and third electrodes, and wherein means is provided for manually moving the second electrode in a fixed path similar to and immediately adjacent the paths of movement of the first and third electrodes.

10. In a machine for shaping a workpiece with a contour determined by the contour of a pattern, the combination of first and second tables rotatable about horizontally spaced vertical axes, said first table being adapted for supporting a pattern and said second table being adapted for supporting a workpiece, means connected with said tables for rotating them relatively slowly and in unison, a main slide guided for longitudinal movements toward and from said first table, a tracer connected with the main slide, means for longitudinally moving the main slide to cause the tracer to follow the shape of a pattern on the first table, a ratio bar on the main slide having a face inclined at an angle to the direction of slide movement, a cross slide guided for transverse movements toward and from the second table, a tool holder carried by the cross slide and adapted to hold a tool for engaging and cutting a workpiece carried by and rotatable with the second table, a cross slide electrode in normally fixed relationship with said cross slide and movable transversely therewith, means for connecting said cross slide electrode in an electric circuit including a short spark gap at said contact which gap tends to vary in length as the main slide and ratio bar are longitudinally moved, and means electrically responsive to variations in the length of said spark gap for transversely moving said cross slide and the parts carried thereby so as to maintain said gap length within predetermined narrow limits and so as to thus cause transverse movements of the cross slide and the said carried parts which are proportionate to the longitudinal movements of the tracer and the main slide.

11. In a machine for shaping a workpiece with a contour determined by the contour of a pattern, the combination of first and second tables rotatable about horizontally spaced vertical axes, said first table being adapted for supporting a pattern and said second table being adapted for supporting a workpiece, means connected with said tables for rotating them relatively slowly and in unison, a main slide guide for longitudinal movements toward and from said first table, a tracer connected with the main slide, means for longitudinally moving the main slide to cause the tracer to follow the shape of a pattern on the first table, a ratio bar on the main side having a face inclined at an angle to the direction of slide movement, a cross slide guided for transverse movements toward and from the second table, a tool holder carried by the cross slide and adapted to hold a tool for engaging and cutting a workpiece carried by and rotatable with the second table, first and second cross slide electrodes which are fixed against longitudinal movement with the main slide and the ratio bar but which are movable transversely, means for maintaining said first cross slide electrode in normally fixed relationship with the cross slide so as to be movable transversely therewith, means for maintaining said second cross slide electrode in fixed relationship with said face of the ratio bar, means for connecting the first and second cross slide electrodes in an electric circuit including a short spark gap between said electrodes which gap tends to vary in length as the main slide and the inclined ratio bar are longitudinally moved, and means electrically responsive to variations in the length of said spark gap for transversely moving said cross slide and the parts carried thereby so as to maintain said gap length within predetermined narrow limits and so as to thus cause transverse movements of the cross slide and the said carried parts which are proportionate to the longitudinal movements of the tracer and the main slide.

12. In a machine for shaping a workpiece with a contour determined by the contour of a pattern, the combination of first and second tables rotatable about horizontally spaced vertical axes, said first table being adapted for supporting a pattern and said second table being adapted for supporting a workpiece, means connected with said tables for rotating them relatively slowly and in unison, a main slide guided for longitudinal movements toward and from said first table, a tracer connected with the main slide, means for longitudinally moving the main slide to cause the tracer to follow the shape of a pattern on the first table, a ratio bar on the main slide having a face inclined at an angle to the direction of slide movement, a cross slide guided for transverse movements toward and from the second table, a tool holder carried by the cross slide and adapted to hold a tool for engaging and cutting a workpiece carried by and rotatable with the second table, a control box connected with the cross slide for transverse movements in unison therewith, a first cross slide electrode normally fixedly located within the control box, a transversely movable plunger carried by the control box and biased rearwardly, means at the rear end of the plunger engaging the inclined face of the ratio bar to limit rearward movement of the plunger, a second cross slide electrode at the forward end of the plunger and in close proximity to the first electrode, means for connecting the first and second cross slide electrodes in an electric circuit including a short spark gap between said electrodes which gap tends to vary in length as the main slide and the inclined ratio bar are longitudinally moved, and means electrically responsive to variations in the length of said spark gap for transversely moving said cross slide and the parts carried thereby so as to maintain said gap length within predetermined narrow limits and so as to thus cause transverse movements of the cross slide and the said carried parts which are proportionate to the longitudinal movements of the tracer and the main slide.

13. A machine as set forth in claim 12, wherein the control box is connected with the cross slide for pivotal movement about a vertical axis, and wherein the means at the rear end of the plunger is a head having a flat face perpendicular to the plunger and engageable with the inclined face of the ratio bar so that the rearward bias of the plunger serves to pivotally move the control box to such an extent that said flat face of the head is fully engaged with the inclined face of the ratio bar.

14. A machine as set forth in claim 13, wherein a bar is rigidly connected to said cross slide and extends rearwardly therefrom, wherein a bracket is carried by said bar and is normally fixed against forward or rearward movement therealong, and wherein said control box is pivotally connected with said bracket for pivotal movement about a vertical axis at one side of said bar.

15. In a machine for shaping a workpiece with a contour determined by the contour of a pattern, the combination of first and second tables rotatable about horizontally spaced vertical axes, means connected with said tables for rotating them relatively slowly and in unison, means on the first table adapted for holding an electrically conductive pattern and adapted for providing an electrical connection with such a pattern, a main slide guided for longitudinal movements toward and from said first table, an electrically conductive tracer connected with the slide and adapted to follow the contour of a conductive pattern on said first table, means for connecting the tracer in an electric circuit including a short spark gap between the tracer and a pattern on said first table which gap during the said relative movement between the tracer and such a pattern tends to vary in length in accordance with the contour of such a pattern, means electrically responsive to variations in the length of the said spark gap for moving the tracer and main slide longitudinally so as to maintain the said gap length within predetermined narrow limits and so as to thus cause the tracer to follow the contour of such a pattern on said first table, a ratio bar on the main slide having a face inclined at an angle to the direction of slide movement, a cross slide guided for transverse movements toward and from the second table, a tool holder carried by the cross slide and adapted to hold a tool for engaging and cutting a workpiece carried by and rotatable with the second table, a cross slide electrode in normally fixed relationship with said cross slide and movable transversely therewith, means for connecting said cross slide electrode in an electric circuit including a short spark gap at said electrode which gap tends to vary in length as the main slide and ratio bar are longitudinally moved, and means electrically responsive to variations in the length of said spark gap for transversely moving said cross slide and the parts carried thereby so as to maintain said gap length within predetermined narrow limits and so as to thus cause transverse movements of the cross slide and the said carried parts which are proportionate to the longitudinal movements of the tracer and the main slide.

16. In a machine for shaping a workpiece with a contour determined by the contour of a pattern, the combination of first and second tables rotatable about horizontally spaced vertical axes, said first table being adapted for supporting a pattern and said second table being adapted for supporting a workpiece, means connected with said tables for rotating them relatively slowly and in unison, a main slide guided for longitudinal movements toward and from said first table, a tracer connected with the main slide, means for longitudinally moving the main slide to cause the tracer to follow the shape of a pattern on the first table, a ratio bar on the main slide having a face inclined at an angle to the direction of slide movement, a cross slide guided for transverse movements toward and from the second table, a tool holder carried by the cross slide and adapted to hold a tool for engaging and cutting a workpiece carried by and rotatable with the second table, a plunger in normally fixed relationship with said cross slide and movable transversely therewith, said plunger being transversely movable relatively to the cross slide and being biased rearwardly to a relatively fixed normal position, a cross slide electrode on said plunger at the rear end thereof, means for connecting said electrode in an electric circuit including a short spark gap at said electrode which gap tends to vary in length as the main slide and ratio bar are longitudinally moved, means electrically responsive to variations in the length of said spark gap for transversely moving said cross slide and the parts carried thereby so as to normally maintain said gap length within predetermined narrow limits and so as to thus cause transverse movements of the cross slide and the said carried parts which are proportionate to the longitudinal movements of the tracer and the main slide, and safety means for rendering inoperative said means for longitudinally moving the main slide, said safety means being dependent for its operation upon forward movement of the cross slide electrode and the plunger from their normal relative positions as the result of failure of the cross slide moving means to move said slide forwardly at a sufficient speed.

17. In a machine for shaping a workpiece with a contour determined by the contour of a pattern, the combination of first and second tables rotatable about horizontally spaced vertical axes, said first table being adapted for supporting a pattern and said second table being adapted for supporting a workpiece, means connected with said tables for rotating them relatively slowly and in unison, a main slide guided for longitudinal movements toward and from said first table, a tracer connected with the main slide, means for longitudinally moving the main slide to cause the tracer to follow the shape of a pattern on the first table, a ratio bar on the main slide having a face inclined at an angle to the direction of slide movement, a cross slide guided for transverse movements toward and from the second table, a tool holder carried by the cross slide and adapted to hold a tool for engaging and cutting a workpiece carried by and rotatable with the second table, a bracket carried by said cross slide and movable transversely therewith, said bracket being transversely movable relatively to the cross slide being normally in fixed relationship therewith, a cross slide electrode in normally fixed relationship with the bracket and movable with said bracket and cross slide, means for connecting said cross slide electrode in an electric circuit including a short spark gap at said electrode which gap tends to vary in length as the main slide and ratio bar are longitudinally moved, means electrically responsive to variations in the length of said spark gap for moving said cross slide and the parts carried thereby rearwardly when the spark gap length is increased and for moving said cross slide and said parts forwardly when the spark gap length is decreased so as to thus cause transverse movements of said cross slide and said parts which are proportionate to the longitudinal movements of the tracer and the main slide, and manually controlled means for transversely moving said bracket relatively to said cross slide whereby relative rearward movement of the bracket reduces the spark gap length and causes the cross slide and the parts carried thereby to be moved forwardly and whereby relative forward movement of the bracket increases the spark gap length and causes said cross slide and said parts to be moved rearwardly.

18. A machine as set forth in claim 17, wherein the means for adjusting the bracket includes a micrometer.

19. A machine as set forth in claim 17, wherein a bar is rigidly connected to said cross slide and extends rearwardly therefrom, and wherein said bracket is carried by said bar and is adjustable forwardly or rearwardly therealong.

20. A machine as set forth in claim 19, wherein a locating member is provided which is forwardly and rearwardly adjustable along said bar and can be clamped in adjusted position, and wherein means is provided for adjusting said bracket relatively to said locating member.

References Cited in the file of this patent

UNITED STATES PATENTS

| | | |
|---|---|---|
| 2,086,915 | Kopp | July 13, 1937 |
| 2,677,310 | Campbell | May 4, 1954 |
| 2,704,012 | Trinkle | Mar. 15, 1955 |